United States Patent [19]
Yu et al.

[11] Patent Number: 5,928,491
[45] Date of Patent: *Jul. 27, 1999

[54] PLANT COMPATIBLE ELECTROLYTE COMPOSITION AS WELL AS ELECTROLYTE IONIZED WATER PRODUCTION DEVICE AND METHODS

[75] Inventors: Xie Yu, Koganei; Michio Takeuchi, Fuchu; Tomomi Ota; Kiyohiko Yamaya, both of Fujisawa, all of Japan

[73] Assignee: Maruko & Co., Ltd., Nagano-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,913

[22] Filed: Jan. 23, 1997

[30] Foreign Application Priority Data

Jan. 23, 1996 [JP] Japan ................................ 8-040242
Aug. 30, 1996 [JP] Japan ................................ 8-266477

[51] Int. Cl.$^6$ .................................................. B01D 17/06
[52] U.S. Cl. ........................ 205/703; 205/746; 205/751; 205/770; 204/252; 71/61; 71/63; 71/64.1; 71/64.08; 504/116; 504/118; 504/119

[58] Field of Search ........................... 204/242, 263, 204/275, 252; 504/116, 118, 119; 71/61, 63, 64.1, 64.08; 205/703, 746, 751, 770

[56] References Cited

U.S. PATENT DOCUMENTS

| | | | |
|---|---|---|---|
| 4,411,685 | 10/1983 | Welebir | 71/84 |
| 4,500,335 | 2/1985 | Fenn | 71/63 |
| 5,102,446 | 4/1992 | Burdick et al. | 71/94 |
| 5,234,563 | 8/1993 | Arai et al. | 204/263 |

*Primary Examiner*—Bruce F. Bell
*Attorney, Agent, or Firm*—Hazel & Thomas

[57] ABSTRACT

Electrolyte ionized water production device wherein voltage is produced or an electrical current is passed, between anode and cathode of an electrolytic cell to which various electrolytes and raw water are supplied after being mixed, and wherein various electrolytes are delivered to an electrolytic cell by use of quantitative pumps and raw water is delivered to said electrolytic cell by use of mechanisms including quantitative pumps or pressure reducing valves, and constant flow valves.

14 Claims, 5 Drawing Sheets

PLANT COMPATIBLE ELECTROLYTE COMPOSITION AS WELL AS ELECTROLYTE IONIZED WATER PRODUCTION DEVICE AND METHODS

DETAILED EXPLANATION OF THE INVENTION

This invention is concerned with a new electrolyte composition or the means and method for producing said new electrolyte composition. The production method involves an electrolyte ionized water production device wherein voltage is produced, or an electrical current is passed, between the anode and cathode of an electrolytic cell, and is characterized by various electrolytes and raw water, mixed and supplied to said electrolytic cell. Said electrolyte composition produced from said electrolyte ionized water production device is compatible with soil and plants, and is composed of chlorides K, Ca and Mg, being elements essential for plants and includes $Ca^{2+}$, $Mg^{2+}$, $K^+$ selected by diaphragm of said electrolytic cell and large quantities of $Ca^{2+}$ and $Mg^{2+}$ selected as priority elements by said diaphragm.

BACKGROUND OF THE INVENTION

The drinking water to which small amounts of the electrolytes NaCl or KCl have been added is passed through a diaphragm and electrolysis is used to produce electrolyte ionized water, research into applicability of the sterilization effects of the highly acidic water component as a sterilizing agent for use in medical treatment, food processing, cosmetics and agricultural fields etc. can be undertaken. Further, the electrolyte ionized water's alkali ionized water component could be considered for use in agriculture to prevent or treat acidification.

When electrolyte ionized water produced with single electrolytes like NaCl or KCl of the kind used up till now, is used for agriculture, there is a fear of salt damage to plants from NaCl, and with KCl, even though $K^+$ is necessary for plants in large amounts, if used in normal quantities of $1-2L/m^2$ of electrolyte ionized water for a long period, the high concentration of $K^+$ in the electrolyte ionized water (especially in the alkali ionized water component), may cause problems through suppression of plant's $Mg^{2+}$ absorption due to increase in $K^+$, and through disturbance of the balance in plants and soil, of K, Ca, and Mg which plants require. This is clear by reference to the table below illustrating highly acid water component in electrolyte ionized water produced from plant compatible electrolyte composition, and ionized water produced from NaCl, KCl electrolytes.

TABLE 1

| | pH | Oxidation reduction potential (mV) | Residual chlorine (ppm) | | |
|---|---|---|---|---|---|
| Plant compatible electrolyte composition | 2.68 | 0.1 | 1095~1100 | 34 | 2 |
| Previous NaCl, KCl electrolytes | 2.7 | 0.1 | 1100 | 32 | 2 |

In order to avoid the problems inherent in the previously used electrolytes above, this invention aims to mix multiple electrolytes rather than single electrolytes with raw water, to form an electrolyte solution which maintains the ion balance in soil and when applied in the field of agriculture prevents salt damage to soil, $Mg^{2+}$, absorption inhibition due to $K^+$ increase, and disturbance of the balance in plants and soil, of K, Ca, and Mg elements required by plants, thus providing a new plant compatible electrolyte with good electrolytic effectiveness.

In order to overcome the previous problems present when using electrolytes for agriculture, the inventors investigated various research results, soil composition, plant physiology and ions that can be selected by the diaphragm of the electrolytic cell in electrolyte ionized water production devices, and made this invention, which is an electrolyte composition containing the 3 elements K, Ca and Mg that are best for maintaining the ion concentration balance from among elements essential for plants in large amounts that are supplied by soil, namely N, P, K, Ca, Mg, S.

This invention features a production method which involves an electrolyte ionized water production device wherein voltage is produced or an electrical current is passed, between the anode and cathode of an electrolytic cell to produce ionized water, which when used for agriculture, is sensitive to soil's ion concentration balance and where various electrolytes, KCL, $CaCl_2$ and $MgCl_2$ which are chlorides, are selected from among elements which are necessary for plants and soil in large quantities, and are mixed with raw water and supplied to an electrolytic cell.

Further features of said invention of plant compatible electrolyte composition and said composition's method of production, are its composition from KCL, $CaCl_2$ and $MgCl_2$ in accordance with the absorption rate of plant compatible ions K, Ca and Mg, and the inclusion of $Ca^{2+}$, $Mg^{2+}$ and $K^+$ due to their selection by the diaphragm inside the electrolytic cell of the electrolyte ionized water production device, as well as the inclusion of large amounts of preferentially selected $Ca^{2+}$, $Mg^{2+}$.

SUMMARY OF THE INVENTION

The device offered by said invention has the following advantages:

1) When electrolytic solutions are produced using a method in which electrolytes are mixed in advance its troublesome to have to measure the weight of the various electrolytes, but with this invention, concentration of electrolytes is adjusted through flow volume rather than weight, enabling easy production of electrolytic solutions formed of various electrolytes and raw water.

2) Where electrolytes are mixed in advance, if an alteration to the concentration of ingredients is desired, the solution must be re-mixed, but with this invention, such alteration can be achieved simply by altering flow volumes.

3) Anyone can easily produce electrolyte ionized water with ingredients in the required concentrations because the use objective is input, and control occurs automatically for electrolyte ingredients ratios set in advance.

4) When alkali ionized water component of produced electrolyte ionized water is used for plant cultivation to remedy or prevent soil acidification or as fertilizer solution, no concerns arise due to inhibition of plants' $Mg^{2+}$ absorption caused by $K^+$ or disturbance of the balance of elements K, Ca and Mg, necessary for plants in large quantities.

5) $Ca^{2+}$, $Mg^{2+}$ and $K^+$ are included as they are selected by the diaphragm in the electrolytic cell of the electrolyte ionized water production device, and large amounts of $Ca^{2+}$ and $Mg^{2+}$ are given selection priority, so that electrolytic ionized water can be produced without the same degree of deterioration of electrolytic effect as occurs where single electrolytes NaCl or KCl used until the present are employed.

BRIEF DESCRIPTION OF THE DRAWINGS

Said invention displays various superior qualities the fundamentals of which are explained in the embodiments below.

DESCRIPTION OF THE EMBODIMENTS

1st Embodiment

Figure 1:
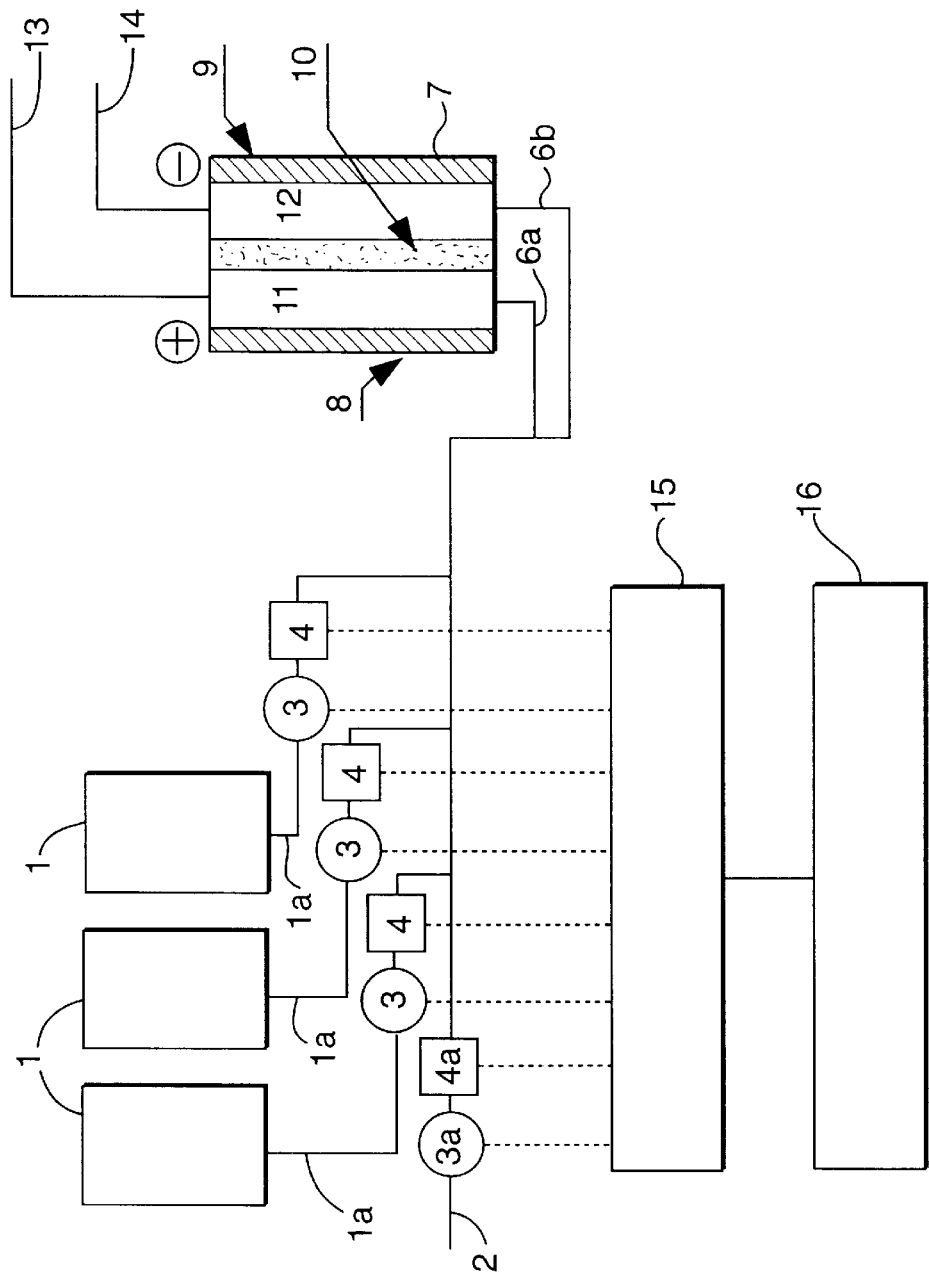
FIG. 1 Outline Drawing of Complete Structure for 1st Embodiment

In FIG. 1, (1) represents several tanks into which single electrolyte has been poured. Said tanks (1) in a row may contain for example, electrolytes such as potassium chloride (KCL), calcium chloride ($CaCl_2$), or magnesium chloride ($MgCl_2$). The electrolytes used in this example are not strictly limited to the above, but electrolytes with the same properties may also be used.

(2) is a raw water source pipe, one end of which is connected to raw water supply source, although this is not shown in the figure. (3a) represents raw water pipe's quantitative pump or pressure reducing valve, or constant flow valve, and (4a) represents raw water pipe's flow meter.

(3) shows quantitative pumps and (4) shows flow meters, both of which are installed on single electrolyte pipes (1a) which pipes are connected to said tanks (1) above and said raw water pipe (2).

(16) is the intended input destination which is connected to quantitative pumps (3) and flow meters (4), installed on single electrolyte pipe (1a) above, and is also connected to raw water pipe's (2) quantitative pumps or pressure reducing valves, or constant flow valve (3a), and raw water pipes flow meter (4a) via control section (15.) Quantitative pumps (3) above, or quantitative pumps or pressure reducing valves, or constant flow valve (3a), are used to control input into intended input destination (16) to achieve desired conditions.

(7) is an electrolytic cell wherein anode chamber (11) and cathode chamber (12) are situated between anode (8) and cathode (9). Said chambers (11) and (12) are segregated by diaphragm (10) placed between them.

(6a) and (6b) in the figure are electrolytic solution admission ports which are connected to the other end of raw water pipe (2) above, and are installed into the bottom of each of chambers (11) and (12) above. (13) indicates strong acid water outlet, connected to upper part of anode chamber (11) above while (14) indicates strong alkali ion water outlet connected to upper part of cathode chamber (12).

Single electrolyte put inside said tanks (1) above moves from single electrolyte pipe (1a) through quantitative pipes (3) and flow controls (4) and enters raw water pipe (2), where said electrolyte passes quantitative pumps or pressure reducing valves, or constant flow valves (3a), as well as raw water flow meter (4a), and mixes with water flowing in said water pipe (2).

At this time, flow volume passing quantitative pumps or pressure reducing valves, or constant flow valves (3a), is measured in raw water pipe flow meter (4a), and flow volume passing quantitative pipe (3) of single electrolyte pipe (1a), is measured in flow meter (4). The values so measured are compared to specified flow volume values and where any discrepancy is evident, control from quantitative pumps or pressure reducing valves, or constant flow valves (3a), or quantitative pumps (3) is necessary to achieve said specified values.

Accordingly, the concentration of single electrolytes is not controlled through adjusting weight, but flow volume through quantitative pumps (3) of single electrolyte pipe (1a) is recorded at flow meter (4) and is adjusted after comparison with flow volume passing quantitative pumps or pressure reducing valves, or constant flow valves (3a), of raw water pipe (2), enabling electrolyte solutions consisting of various electrolytes and raw water to be easily made.

2nd Embodiment

Figure 2:
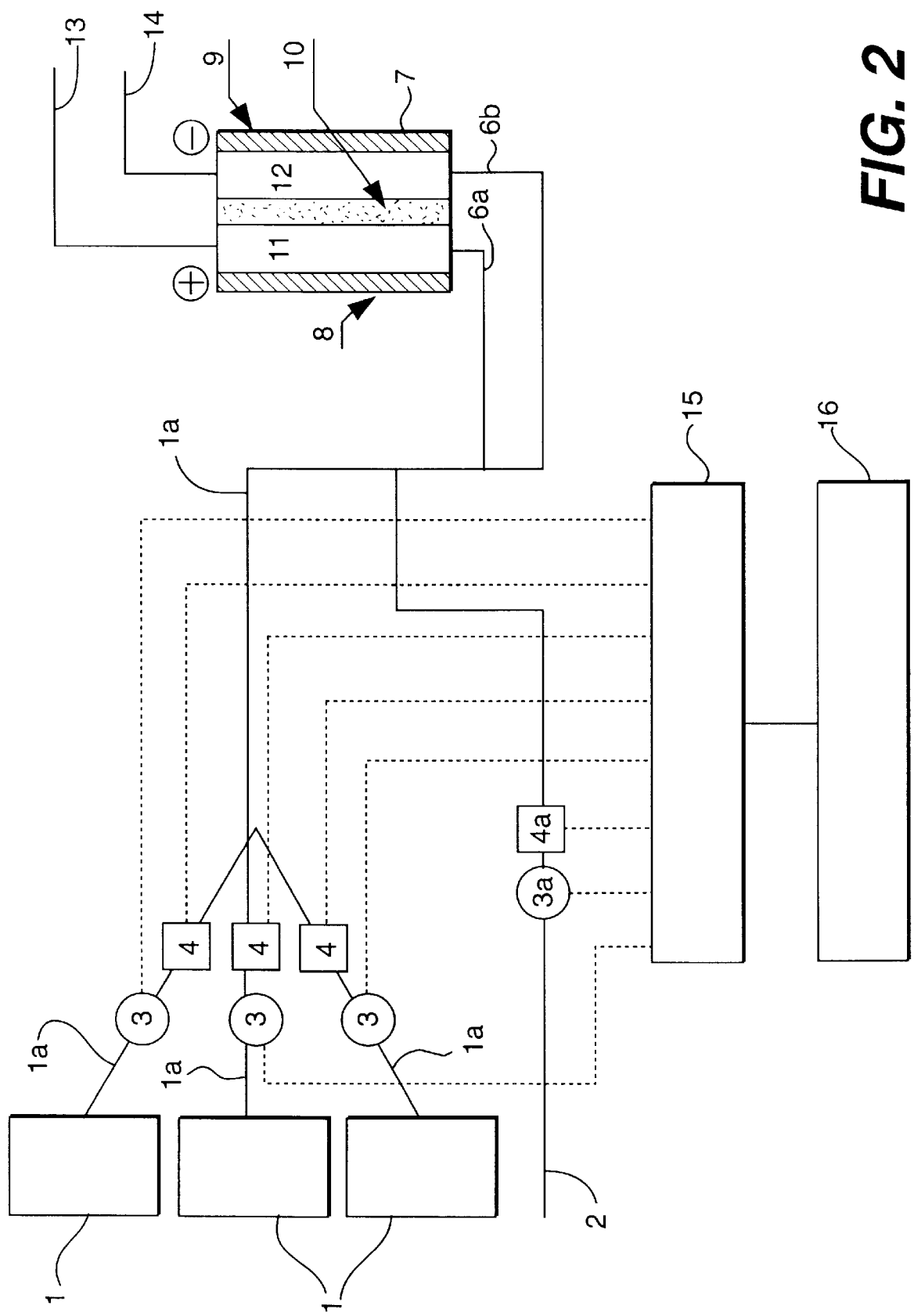
FIG. 2 Outline Drawing of Complete Structure for 2nd Embodiment

Each single electrolyte pipe (1a) in the above example, equipped with quantitative pumps (3) and flow controls (4) is connected to raw water pipe (2) however, its possible for said pipes (1a) to connect with raw water pipe (2) as 1 pipe after said pipes have passed through quantitative pumps (3) and flow controls (4) as shown in FIG. 2.

3rd Embodiment

Figure 3:
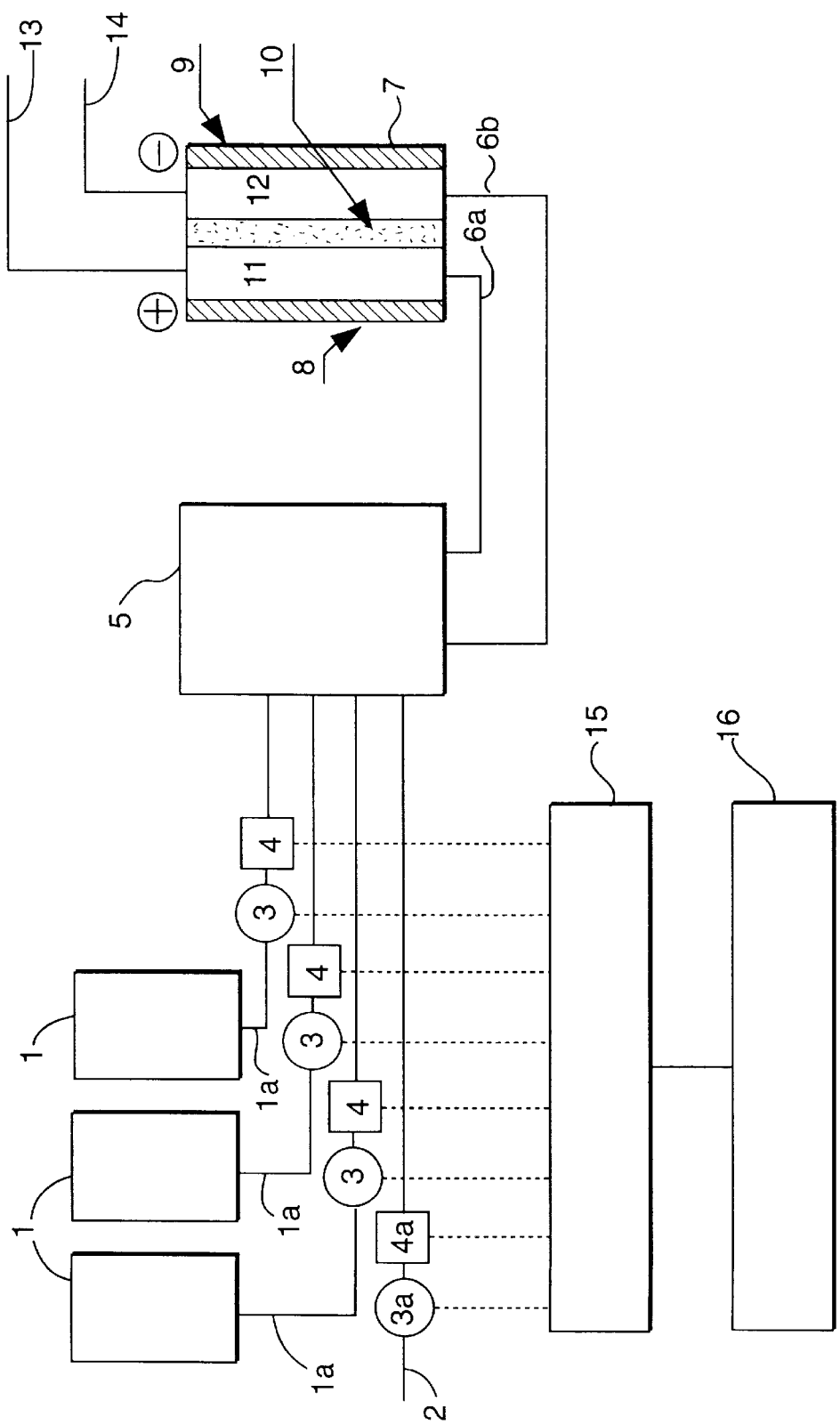
FIG. 3 Outline Drawing of Complete Structure for 3rd Embodiment

In the previous two examples, raw water and electrolytes mix inside raw water pipe (2) however, the device shown in FIG. 3, is an example of a set up wherein mixing chamber (5) is installed, and its possible for each single electrolyte pipe (1a) and raw water pipe (2) to be connected to said mixing chamber (5), and the electrolytes from each tank (1) to be mixed with raw water from raw water pipe (2) inside said chamber.

4th Embodiment

Figure 4:
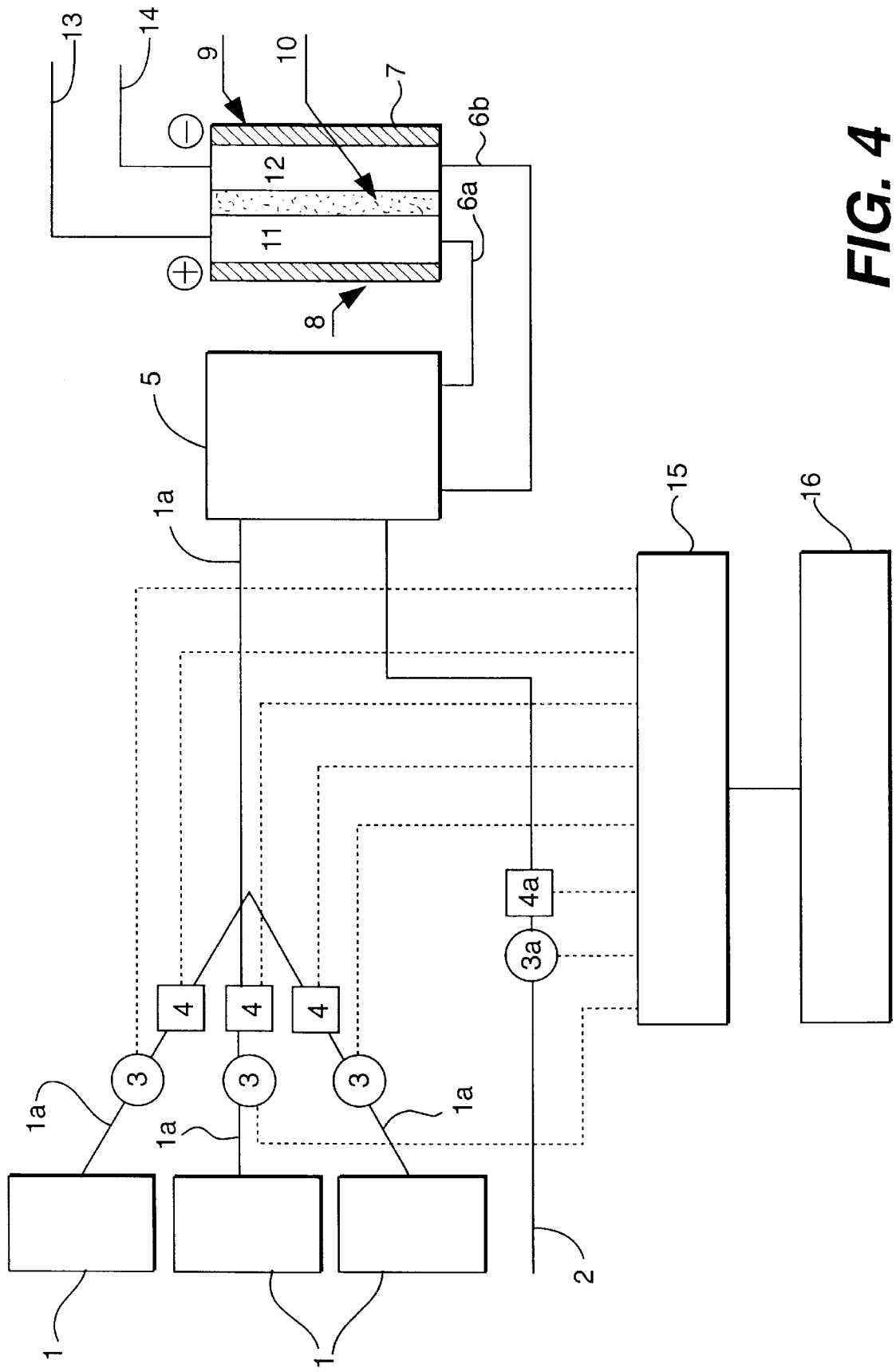
FIG. 4 Outline Drawing of Complete Structure for 4th Embodiment

FIG. 4 shows a set up wherein the devices of both embodiment 2 and embodiment 3 are combined. Its possible for single electrolyte pipes (1a) to form into 1 pipe and then connect to mixing chamber (5).

Production Method Embodiment

The composition of plant compatible electrolyte composition can be set to co-ordinate with the adsorption rates of a wide range of plants such as vegetables, grass lawn, flowering plants, fruit trees and rice or wheat, as indicated in the table below:

TABLE 2

| Weight mix ratios (%) for plant compatible electrolyte composition | | | |
|---|---|---|---|
| | KCl | $CaCl_2$ | $MgCl_2$ |
| Vegetables | 49% | 36% | 15% |
| Grass lawn | 24% | 33% | 43% |
| Flowering Plants | 64% | 24% | 12% |
| Fruit trees | 32% | 53% | 15% |
| Rice, wheat | 63% | 22% | 15% |

Figure 5:
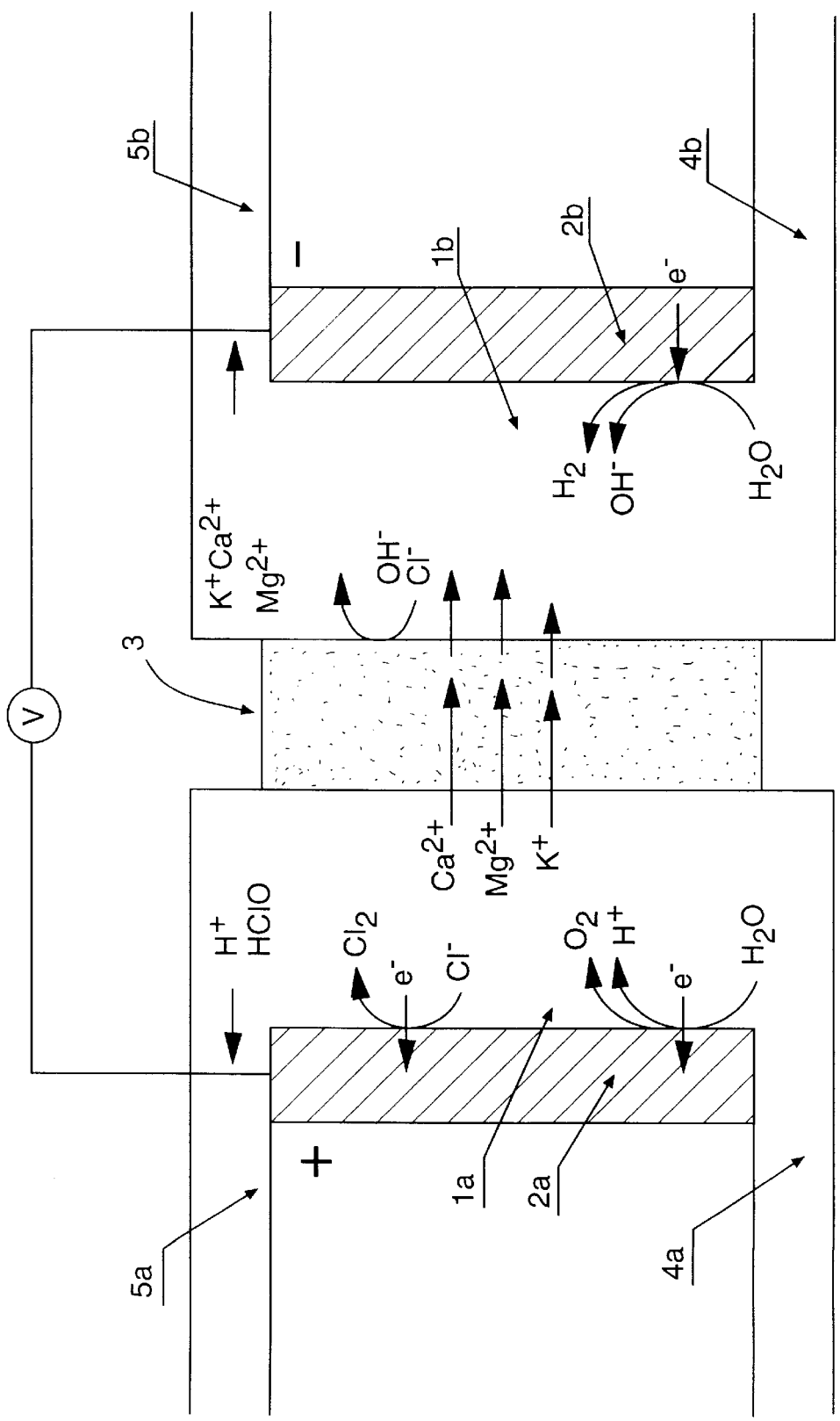
FIG. 5 Principle Drawing for Production of Electrolyte Ionized Waterform Plant Compatible Electrolyte Composition

The plant compatible electrolyte composition is electrolyzed in the electrolyte ionized water production device as shown in FIG. 5.

1st Embodiment of Production Method 6.17 g of electrolyte for vegetables, 5.49 g of electrolyte for grass lawn, 6.48 g of electrolyte for flowering plants, 5.88 g of electrolyte for fruit trees, 6.42 g of electrolyte for rice and wheat and 7.46 g of single electrolyte KCl and 5.84 g of single electrolyte NaCl used previously, are dissolved in 1 L of distilled water each, each electrolyte solution's Cl ion concentration is adjusted to 0.1 mol, and electrolyte ionized water (current density 50 mA/cm$^2$, 8.5V output from DC power supply) is generated from an electrolyte ionized water production device (MF cell type, from Tokyo University of Agriculture and Engineering.)

The ionized water's highly acidic water component's pH level, oxidation reduction potential, and residual chlorine concentration of the electrolyte produced from said plant compatible electrolyte composition are measured and compared with those produced from electrolytes NaCl or KCl used until now and the results, recorded in table 2, display that for the former, there is a higher level of residual chlorine concentration which show the level of the highly acidic water's effectiveness for sterilization, confirming the occurrence of effective electrolysis.

With the electrolyte ionized water produced from plant compatible electrolyte composition, set ratios of elements $Ca^{2+}$, $Mg^{2+}$ and $K^+$ are included in alkali ionized water due to the ability of the electrolytic cell's diaphragm to select said elements.

2nd Embodiment of Production Method

In the electrolyte solution, with standard Cl ion concentration of 0.1 mol, 6.17 g electrolyte for vegetables, 5.49 g of electrolyte for grass lawn and 7.46 g of single electrolyte KCl used until now, are dissolved in 1 L of distilled water each, and electrolyte ionized water (current density 50 mA/cm$^2$, 8.5V output from DC power supply) with approximately equal sterilization strength is produced for each from electrolyte ionized water production device (MF type, from Tokyo University of agriculture and Engineering.) The amounts of elements required by plants included in the electrolyte ionized water thus produced are as follows:

TABLE 3

Amounts of elements required by plants included in electrolyte ionized water produced from electrolyte composition for vegetables and grass lawn, and single electrolyte used previously.

|  | Potassium | Calcium | Magnesium |
| --- | --- | --- | --- |
| Electrolyte for vegetables | 1.58 | 0.80 | 0.24 |
| Electrolyte for grass lawn | 0.69 | 0.65 | 0.60 |
| Simple KCL electrolyte | 3.91 | absent | absent |

It is understood from these results that elements required by plants in electrolyte ionized water produced from electrolyte composition for vegetables and grass lawn are compatible with vegetables and grass lawn.

If the amount of electrolyte ionized water used is normally 1–2L/m$^2$, then if electrolyte ionized water produced from simple KCL electrolyte, is applied to open air cultivated farmland at the standard fertilizer ratio of 6–7 g potassium for every 3.3 m$^2$, because the amount of potassium is relatively large, if used for long periods, suppression of $Mg^2$ absorption through increase of $K^+$ in plants, as well as disturbance to the balance in the soil and plants of K, Ca and Mg elements plants need, can be predicted.

We claim:

1. A plant compatible, aqueous electrolyte composition consisting essentially of $K^+$, $Ca^{2+}$ and $Mg^{2+}$ which is prepared by mixing water as electrolytic promoter with the constituents KCl, $CaCl_2$ and $MgCl_2$ and electrolyzing the mixture to remove the chloride ions, to make the alkaline water plant compatible aqureous electrolyte composition.

2. A composition according to claim 1 wherein the plant is a vegetable and the constituents are present in a ratio of about 49:36:15, respectively.

3. A composition according to claim 1 wherein the plant is lawn grass and the constituents are present in a ratio of about 24:33:43, respectively.

4. A composition according to claim 1 wherein the plant is a flowering plant and the constituents are present in a ratio of about 64:24:12, respectively.

5. A composition according to claim 1 wherein the plant is a fruit tree and the constituents are present in a ratio of about 32:53:15, respectively.

6. A composition according to claim 1 wherein the plant is rice or wheat and the constituents are present in a ratio of about 63:22:15, respectively.

7. A method for the promotion of plant growth which comprises administering to said plants an effective amount of a plant compatible electrolyte composition as claimed in claim 1.

8. A method according to claim 7 wherein the plant is a vegetable and the constituents are present in a ratio of about 49:36:15, respectively.

9. A method according to claim 7 wherein the plant is lawn grass and the constituents are present in a ratio of about 24:33:43, respectively.

10. A method according to claim 7 wherein the plant is a flowering plant and the constituents are present in a ratio of about 64:24:12, respectively.

11. A method according to claim 7 wherein the plant is a fruit tree and the constituents are present in a ratio of about 32:53:15, respectively.

12. A method according to claim 7, wherein the plant is rice or wheat and the constituents are present in a ratio of about 63:22:15, respectively.

13. A process of preparing a plant compatible electrolyte composition comprising:

mixing KCl, $CaCl_2$ and $MgCl_2$ with raw water;

supplying the resulting mixture to an electrolytic cell which is sensitive to $Ca^{2+}$, $Mg^{2+}$, and $K^+$; and passing an electrical current between the anode and cathode of the electrolytic cell, to remove chloride ions to make an alkaline plant compatible electrolyte composition.

14. A process according to claim 13, wherein the mixture is supplied to the electrolytic cell by use of quantitative pumps and constant flow rates.

* * * * *